US009007689B2

(12) United States Patent
Abramovich et al.

(10) Patent No.: US 9,007,689 B2
(45) Date of Patent: Apr. 14, 2015

(54) METHOD AND APPARATUS FOR FORMING MULTIPLE IMAGES

(75) Inventors: Gil Abramovich, Niskayuna, NY (US); Kevin George Harding, Niskayuna, NY (US); Robert William Tait, Niskayuna, NY (US); Mark Marshall Meyers, Mechanicsville, NY (US); Qingying Hu, Bellevue, WA (US)

(73) Assignee: General Electric Company, Schenectady, NY (US)

( * ) Notice: Subject to any disclaimer, the term of this patent is extended or adjusted under 35 U.S.C. 154(b) by 243 days.

(21) Appl. No.: 13/066,000

(22) Filed: Apr. 4, 2011

(65) Prior Publication Data

US 2012/0250159 A1    Oct. 4, 2012

(51) Int. Cl.
*G02B 27/10* (2006.01)
*G02B 27/00* (2006.01)
*G02B 27/12* (2006.01)

(52) U.S. Cl.
CPC .......... *G02B 27/0075* (2013.01); *G02B 27/123* (2013.01)

(58) Field of Classification Search
USPC .................................................. 359/618–628
See application file for complete search history.

(56) References Cited

U.S. PATENT DOCUMENTS

| | | | |
|---|---|---|---|
| 6,084,712 A * | 7/2000 | Harding | 359/618 |
| 6,922,430 B2 * | 7/2005 | Biswas et al. | 372/100 |
| 7,230,717 B2 | 6/2007 | Brock et al. | |
| 2005/0275940 A1 * | 12/2005 | Chen et al. | 359/399 |
| 2010/0110557 A1 * | 5/2010 | Geidek et al. | 359/627 |
| 2010/0200658 A1 * | 8/2010 | Olmstead et al. | 235/455 |
| 2010/0201865 A1 | 8/2010 | Han et al. | |

OTHER PUBLICATIONS

K. Harding, "3D Imaging System for Biometric Applications", Proc. of SPIE, vol. 7690, pp. 76900J-1 to 76900J-12 (2010).*
M. Watanabe, S. K. Nayar, and M. Noguchi, "Real-time Computation of Depth from Defocus," Proc. of SPIE, vol. 2599, pp. 14-25 (1995).
T. Xian and M. Subbarao, "Performance Evaluation of Different Depth from Defocus (DFD) Techniques," Proc. of SPIE, vol. 6000, pp. 87-99 (2005).
O. Ghita, P. F. Whelan, and J. Mallon, "Computational Approach for Depth from Defocus," Journal of Electronic Imaging, vol. 14(2), pp. 023021-1 to 023021-8 (Apr.-Jun. 2005).
S. Cho, W.J. Tam, F. Sparanza, R. Renaud, N. Hur, and S.I. Lee, "Depth Maps Created from Blur Information Using Images with Focus at Near and at Far," Proc. of SPIE, vol. 6055, pp. 462-473 (2006).

(Continued)

*Primary Examiner* — Thomas K Pham
*Assistant Examiner* — Sharrief Broome
(74) *Attorney, Agent, or Firm* — Jean Testa

(57) ABSTRACT

Disclosed are method and apparatus for forming multiple images of an object comprising a plurality of depth segments. An optical system comprises an infinity optical subsystem and a multi-image optical subsystem. The infinity optical subsystem is configured to receive light from the object and form a first image focussed at infinity. A multi-image optical subsystem is configured to receive the first image and form multiple images via multiple focussing lenses. Each multiple image can correspond to a different depth segment. A portion of the light from the first image can also be filtered before entering a focussing lens. Multiple images under different filtering conditions, corresponding to different depth segments or to the same depth segment, can be formed.

4 Claims, 11 Drawing Sheets

(56) References Cited

OTHER PUBLICATIONS

K. G. Harding, "Analysis of Methods for Image Rearrangement," Proc. of SPIE, vol. 2065, pp. 10-16 (1994).

K. Harding, G. Abramovich, V. Paruchura, S. Manickam, and A. Vemury, "3D Imaging System for Biometric Applications", Proc. of SPIE, vol. 7690, pp. 76900J-1 to 76900J-12 (2010).

* cited by examiner

METHOD AND APPARATUS FOR FORMING MULTIPLE IMAGES

BACKGROUND OF THE INVENTION

The present invention relates generally to imaging, and more particularly to method and apparatus for forming multiple images.

Image analysis systems that characterize three-dimensional objects based on information from one or more two-dimensional images are used for a variety of applications. For biometric applications, such as facial recognition and fingerprint analysis, depth information is important. To acquire depth information, various methods have been deployed. In one method, images are taken with one or more cameras positioned at multiple angles and distances with respect to the object. In a second method, images are taken with a camera at multiple focus settings. In a third method, images are taken with a camera as the object is obliquely illuminated by a light source positioned at multiple angles and distances with respect to the object.

Information from multiple images can be fused to generate one or more characteristic two-dimensional composite images that contain more information than a single two-dimensional image. Imaging systems that take a series of images over an interval of time, however, are susceptible to image registration errors caused by movement of the object. Movement can be unintentional (for example, when the object is a human face, a person typically cannot hold his head perfectly still) or intentional (for example, if a facial recognition system is tracking the identities of people as they walk through an airport). Imaging systems using multiple cameras or multiple oblique lighting sources, furthermore, require multiple mounts, such as tripods, distributed about the object. What is needed is an imaging system that can take multiple simultaneous images providing depth information and other optical information. An imaging system that can be implemented as a compact, integrated, portable unit (similar to a single camera), would be advantageous.

BRIEF DESCRIPTION OF THE INVENTION

Multiple images of an object comprising a plurality of depth segments are formed by an optical system. In one embodiment, the optical system comprises an optical subsystem configured to receive light from the object and form a first image focussed at infinity. A first portion of the first image is received by a first focussing lens, and a second image is formed by the first focussing lens on an image plane. The second image corresponds to a first depth segment selected from the plurality of depth segments. A second portion of the first image is received by a second focussing lens, and a third image is formed by the second focussing lens on the image plane. The third image corresponds to a second depth segment that is different from the first depth segment.

In another embodiment, the optical system comprises an optical subsystem configured to receive light from the object and form a first image focussed at infinity. A first portion of the first image is filtered by a filter. The filtered first portion of the first image is received by a first focussing lens, and a second image is formed by the first focussing lens on an image plane. The second image corresponds to a first depth segment selected from the plurality of depth segments. A second portion of the first image is received by a second focussing lens, and a third image is formed by the second focussing lens on the image plane. The third image corresponds to a second depth segment. The second depth segment can be substantially equal to the first depth segment, or the second depth segment can be different from the first depth segment.

These and other advantages of the invention will be apparent to those of ordinary skill in the art by reference to the following detailed description and the accompanying drawings.

DETAILED DESCRIPTION

Figure 1:
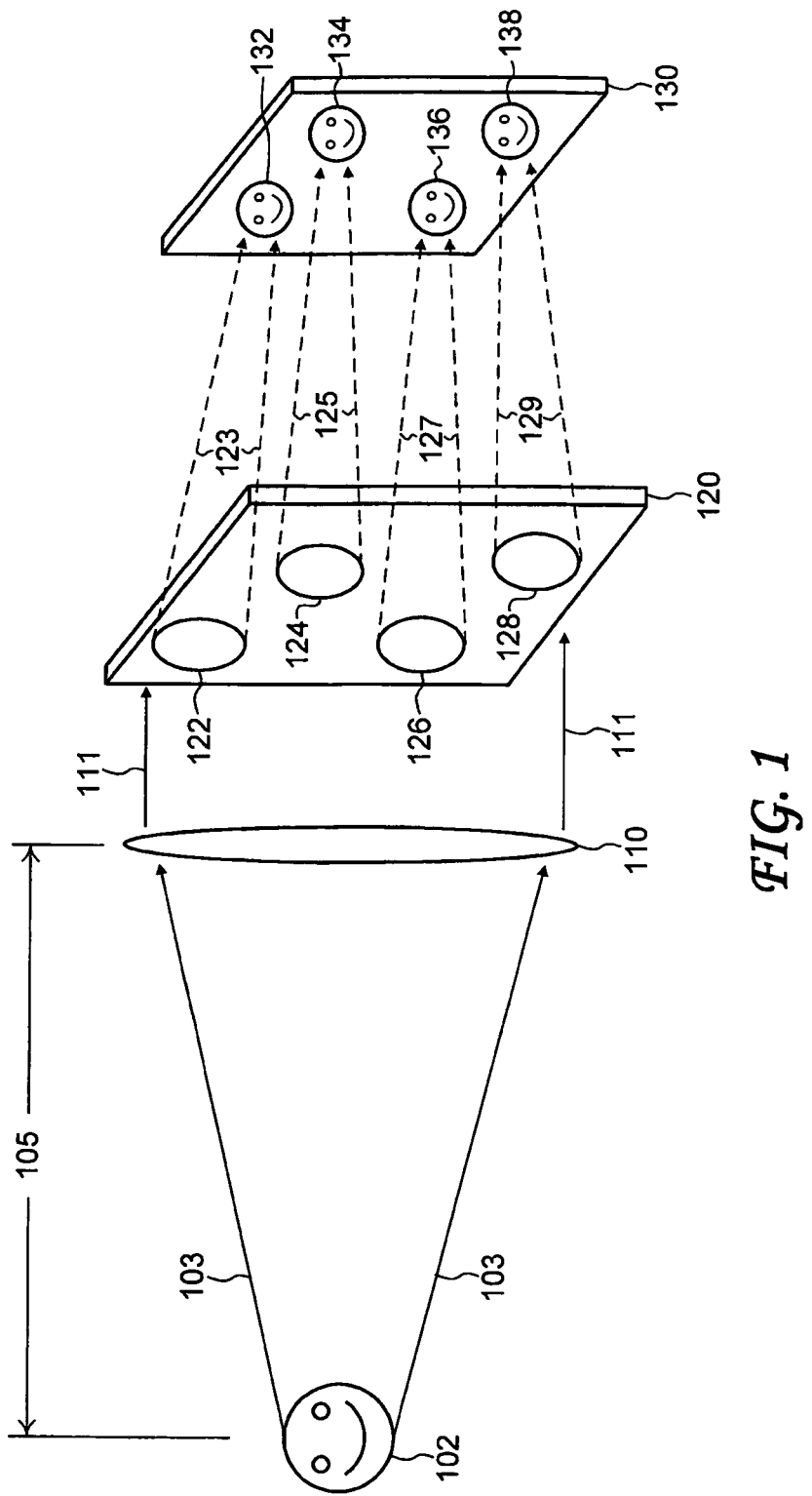
FIG. 1 shows a schematic diagram of an embodiment of a multi-image optical system in which an image focussed at infinity is formed by an objective lens.

In a simplified model of an optical system with a single objective lens, the optical axis can serve as a reference axis for a Cartesian x-y-z coordinate system. For a three-dimensional object positioned along the optical axis, the optical axis is referenced as the z-axis (also referred to as the longitudinal axis), and the x-y plane is referenced as the object plane (also referred to as the lateral plane). Lateral dimensions of the object are measured with respect to the x-axis and the y-axis; the depth of the object is measured with respect to the z-axis.

When the optical system is focussed at a depth $Z_f$ in the object, portions of the object in a range of depths about $Z_f$ are in focus in the resulting image. This range of depths is referred to as the depth of field, which depends on a number of factors (discussed below).

To characterize a three-dimensional object, multiple images of the object can be taken. In the depth from focus quality method, a set of images, focussed at different depths, are taken. The set of images is searched, and the images with the least amount of blur are identified. Some microscope systems use this approach to define regions within each image that are best focussed; these regions are then combined to generate a single in-focus image.

The focus is incrementally varied over a focal range. In practice, to analyze depth from focus quality, the focal range exceeds the depth of the object to allow for flexibility in the positioning of the object. Ideally, data is collected with an image at the far and near range points. To collect the highest possible lateral resolution data on the object, however, it is desirable to collect a full set of clear images through the depth of the object. The ability to collect a clear, high lateral-resolution set of images assumes that the gross focus depth of each image is less than the object depth.

For obtaining accurate three-dimensional (3-D) data from depth from focus quality, a key parameter to control is the depth-of-field of the images. The depth-of-field (DOF) is given generally by the expression:

$$DOF = 2(\text{system } F\text{-number}) \times (\text{resolution blur spot}),$$

where the F-number of an optical system is the working distance divided by the limiting aperture of the optical system. Typically, the limiting aperture of an optical system is the aperture of the lens, but it can be any smaller aperture that is viewed through the optical system; for example, many camera lenses include an adjustable diaphragm to vary the aperture.

Resolution is optically defined as the ability to distinguish two closely spaced points or features. In keeping with conventional optical terminology, "resolution" refers herein to lateral resolution within the object plane. "Depth resolution" refers herein to resolution along the longitudinal axis. The resolution for most optical systems is assumed to be no better than the diffraction limit given approximately by the F-number in microns or by:

$$\text{Resolution} = \frac{1.22 \times (\text{distance to object}) \times (\text{wavelength of light})}{(\text{diameter of the limiting aperture})}.$$

For example, at an object distance of 10 meters, to achieve a resolution on the order of 0.1 millimeters, an optical system would require an aperture size of about 10 centimeters. The optical system would then have a DOF of about 20 millimeters. Over the 20-millimeter DOF, the focus of a 0.1-millimeter feature will not appear to change. The image does not become unusable beyond this range, but, for features outside of the DOF, the edges of features of this size will begin to blur.

The relationship between DOF and resolution scales with object distance. At an object distance of 20 meters, with a feature size of 0.2 millimeters, the DOF is also about 20 millimeters. The diffraction limit is 0.2 millimeters with a 100-millimeter diameter objective lens aperture. To visibly discern that a feature is out of focus, typically the feature needs to be at least 2×DOF (40 millimeters in this example) distant from the distance of sharp focus.

To obtain depth information from the focus quality of the image, the optical system determines a change in the focus quality from a decrease in contrast of features. For best data quality, the features of interest should be clearly resolved. In some instances, a small feature such as surface texture, or added features such as a projected pattern, can be used to obtain the 3-D information, while the features of interest can be larger features. Obtaining a balance between detailed 3-D information and high resolution can be achieved using the relationships described above.

Creating a shallower depth-of-field allows for better depth resolution. The ability to resolve a given change in depth is a function of the depth-of-field, the resolution of features used to measure the depth, and the modulation transfer function (MTF) of the optical system. The MTF is the measure of the contrast of any given frequency that the optical system is able to reproduce. For example, an optical system may be able to resolve a feature that is 0.01 millimeters in size, but the contrast at that size may only be 20 percent, thereby producing a low signal to noise for analysis. The basic relationship for depth resolution in a depth from focus quality system can be approximated from:

$$\text{Minimum Depth Resolution} = MTF \times [(\text{feature resolution})/2] \times (\text{depth-of-field}) \times (\text{minimum detectable contrast}),$$

where the depth-of-field and the MTF are taken at the feature resolution used to determine the depth.

For example, using a feature size of 0.1 millimeters, which appears to stay in focus over a 10-millimeter DOF, a lens that will produce a contrast at 0.1 millimeters of 20 percent (0.2 contrast), and a detection method able to reliably detect changes in contrast of 10 percent, the optical system could be expected to resolve a depth change of 1 millimeter. Using a feature size of 2 millimeters, with the other parameters the same, increases the minimum depth resolution to 2 millimeter. Improving the detection capability to detect 1 percent contrast changes reliably would afford a depth resolution of 0.2 millimeters. The minimum detectable contrast implies having a capability to determine a light level change of at least 2.5 smaller than that contrast change to be sufficiently sampled. This value is based upon standard statistical sampling. For example, if going across an edge, the light changes by 10 grey levels on a video camera, the video camera must have noise less than 4 grey levels to reliably determine that the light transition has changed by 10 grey levels, and not 5 or 15 grey levels. The maximum allowable noise is known as the sampling or Nyquist limit. To round off a number to the nearest ten count, a noise of less than half of that amount is needed.

To adjust the sensitivity of the system, the DOF can be changed, the smallest feature resolved can be changed, or the noise level of the detection system can be changed. Also, a lens with a better MTF will provide better depth resolution, for any given resolution.

The requirement for depth resolution also affects the alignment tolerances of a multi-lens optical system. In a multi-lens optical system, the multiple focus planes are created by using lenses with different focal lengths or different distances from an image detector. In any optical system, the longitudinal magnification is the square of the lateral magnification. For example, if an optical system is used with a 0.1 millimeter feature and a depth resolution at the object of 1 millimeter, and if the lens system demagnifies this information laterally by 10×, then the depth distance of 1 millimeter at the object plane is only 0.01 millimeters (10 microns) at the image plane. Any disturbance that would cause the image to shift in depth (along the optical axis) by more than that 10 microns would then change the depth measurement by the depth resolution interval at the object.

One mis-alignment that can cause a shift of the image is a tilting of a lens. To maintain a uniform depth resolution, the magnification would need to be maintained across the image. Tilting of a lens creates a keystone shaped image, where the magnification on one side of the image is different from that on the other side of the image. Aberrations such as geometric distortion also create an effective change in magnification, but, in that instance, radially from the center of the image. In general, a measurement is typically considered good if the errors across a field are less than 10 percent of the measurement resolution. Therefore, an advantageous system would have alignment and geometric errors such that:

(Change in feature size across image)<0.1×(feature resolution)×(magnification squared).

For a lateral demagnification of 10× and a depth resolution of 1 millimeter using a feature resolution of 0.1 millimeters, the geometric error in the image should be less than 0.0001 millimeters. Since the 0.1 millimeter feature is demagnified to 0.01 millimeters in the image, this corresponds to a geometric distortion of less than 1 percent. The amount of tilt of a lens allowed is then a function of the focal length of the lens and the magnification of the optical system. For a typical setup, such as in the example given above, this would imply a tilt of less than 0.57 degrees or the arctan of 0.01 (an error in the image of 1 percent of the focal length). These values are example guidelines; actual values depend on the desired optical performance.

The basic parameters of depth of field and multiple images as described above can be used to build up three-dimensional information about an object by localizing which parts of the object is in focus in each of the series of focussed image planes. This approach, known as depth from focus, uses a specific image to identify each depth region on the object. Between the specific image planes, depth is typically interpolated. To obtain more steps in depth requires more images along the depth.

An alternative to calculating depth from a stack of discrete focus planes is to take an image at the two extremes of the depth range of interest, and then use the amount of defocus to calculate the depth range of all other features in between. The amount of defocus blur can be used to estimate how far a particular image feature is from best focus. In this method, referred to as depth from defocus, the blur is typically modeled as a convolution of the in-focus image and an effective point spread function that can be calculated geometrically from the formula:

$$R=\{1/f-1/o-1/s\}Ds/2,$$

where R is the blur radius, D is the diameter of the collection aperture, f is the focal length of the lens, o is the object distance to the object, and s is the image distance to the image sensor. This estimation can be done using a local operator L over x and y of the form:

$$L(x,y)=e^{-(x^2+y^2)/(2\sigma^2)}\cos((2\pi/T)x'+\phi),$$

where
  $x'=x\cos\theta-y\sin\theta$, and
  $y'=x\sin\theta+y\cos\theta$.
Here T is the feature size on the object used to find the blur; $\sigma$ is the standard deviation of the equivalent Gaussian filter; $\theta$ is the angle of illumination with respect to the surface normal; and $\phi$ is the phase offset. This approach assumes that the effect of blur is primarily to spread the local feature information and to decrease the rate of change of intensity (derivative of the contrast) of the edges. In some cases, such as in autofocus systems, just the contrast of edges is considered in each area. Alternatively, the frequency content of the fuzziness is often modeled as a Laplacian calculated around a narrow band of the primary frequencies (spacing) of texture or projected features on the object.

Herein, an object comprises a set of depth segments. Each depth segment $DS_i$ comprises a portion of the object with a depth z in the depth range $Z_i \leq Z \leq Z_{i+1}$, where i is an integer from 0 to I. The value $Z_0$ corresponds to the minimum depth sampled, and the value $Z_{I+1}$ corresponds to the maximum depth sampled. As discussed above, in practice, the total sampled depth range can exceed the total depth of the object. The depth range for each depth segment can be constant or can be variable. Depth segments can be non-overlapping or can be partially overlapping. Two depth segments are substantially equal if they overlap completely (within measurement error). Two depth segments are different if they are not substantially equal.

Herein, an image corresponds to a depth segment in the object if the image contains information about the depth segment. Information comprises structural and optical characteristics of the depth segment. Information can be acquired from both focussed and defocussed images.

As discussed above, taking a set of images in series can lead to inaccurate analysis if the object moves or changes form between images. Taking a large set of images in series, furthermore, can be time consuming. In embodiments of the invention described below, a set of images corresponding to different depth segments are taken in parallel (simultaneously).

FIG. 1 shows a schematic diagram (perspective view) of a first embodiment of a multi-image optical system. Object 102 represents an arbitrary three-dimensional object of interest. Examples of objects include a person, a portion of a person (such as a face or a fingertip), a screw, and a car. In the embodiments discussed herein, object 102 is represented by an icon of a human face. The multi-image optical system forms simultaneous multiple images focussed at different depths in the object; the images correspond to different depth segments.

Light rays 103 are transmitted from or reflected by object 102. Object 102 can be illuminated by ambient light or by a specific light source. A flash lamp or a stroboscopic lamp can be used to reduce image degradation resulting from object movement. Object 102 can also include light sources, such as light-emitting diodes or fluorescent regions. Although light rays in the visible spectrum are commonly used, light rays in the infrared spectrum and ultraviolet spectrum can also be used (with appropriate lenses and image detectors). Light rays 103 enter lens 110, referred to as an objective lens. In the embodiments described herein, for simplicity, a lens is illustrated as a simple, thin lens. In practice, a lens can be a thick lens, a compound lens, or a multi-element lens. In an embodiment, lens 110 is a zoom lens, which permits variable magnification. The distance 105 between object 102 and lens 110 is set substantially equal to the focal length of lens 110. Lens 110 therefore forms an image of object 102 at infinity, as represented by the parallel light rays 111 exiting lens 110.

Herein, two quantities are substantially equal if they are equal to within a user-defined tolerance. The user-defined tolerance is typically defined by an optical engineer based on factors such as measurement errors, desired image quality, available manufacturing tolerances, and cost. Herein, two quantities are different if they are not substantially equal.

An array of lenses, referred to as focussing lenses, is mounted on carrier plate 120. In the embodiment shown in FIG. 1, the array of lenses comprises four focussing lenses, denoted lens 122, lens 124, lens 126, and lens 128. In an embodiment, one or more of the focussing lenses is a zoom lens, which permits variable magnification. In general, the array of lenses comprises N lenses, where N≥2. Lens 122, lens 124, lens 126, and lens 128 are positioned such that the aperture of each lens lies within the aperture of lens 110. The optical axis of lens 122, the optical axis of lens 124, the optical axis of lens 126, and the optical axis of lens 128 are each substantially parallel to the optical axis of lens 110. Herein, one optical axis is substantially parallel to a second optical axis if they a parallel to within a user-defined tolerance. The user-defined tolerance is typically defined by an optical engineer based on factors such as measurement errors, desired image quality, available manufacturing tolerances, and cost.

Image detector 130 has a planar geometry. Examples of image detectors include scanning arrays and staring arrays. Image detectors can be manufactured from various devices, including photodiodes and charge-coupled devices. The image plane is normal to the optical axis of lens 122, the optical axis of lens 124, the optical axis of lens 126, and the optical axis of lens 128. An image detector can be used in conjunction with a shutter to form still images. An image detector can also be used to record video images.

Signals from the image detector can be transmitted to an image processing system (not shown), which can process the multiple images. The image processing system, for example, can execute depth-from-focus and depth-from-defocus algorithms. The image processing system can also generate various composite images.

In one embodiment, the distance between lens 122 and image detector 130, the distance between lens 124 and image detector 130, the distance between lens 126 and image detector 130, and the distance between lens 128 and image detector 130 are all substantially equal. The focal length of lens 122, the focal length of lens 124, the focal length of lens 126, and the focal length of lens 128 are all different.

Light rays 111 enter lens 122, which focuses light rays 123 to form image 132 on image detector 130. Light rays 111 enter lens 124, which focuses light rays 125 to form image 134 on image detector 130. Light rays 111 enter lens 126, which focuses light rays 127 to form image 136 on image detector 130. Light rays 111 enter lens 128, which focuses light rays 129 to form image 138 on image detector 130. Image 132, image 134, image 136, and image 138 are focussed at different depths in the object 102. Image 132, image 134, image 136, and image 138 correspond to different depth segments in object 102.

Figure 2:
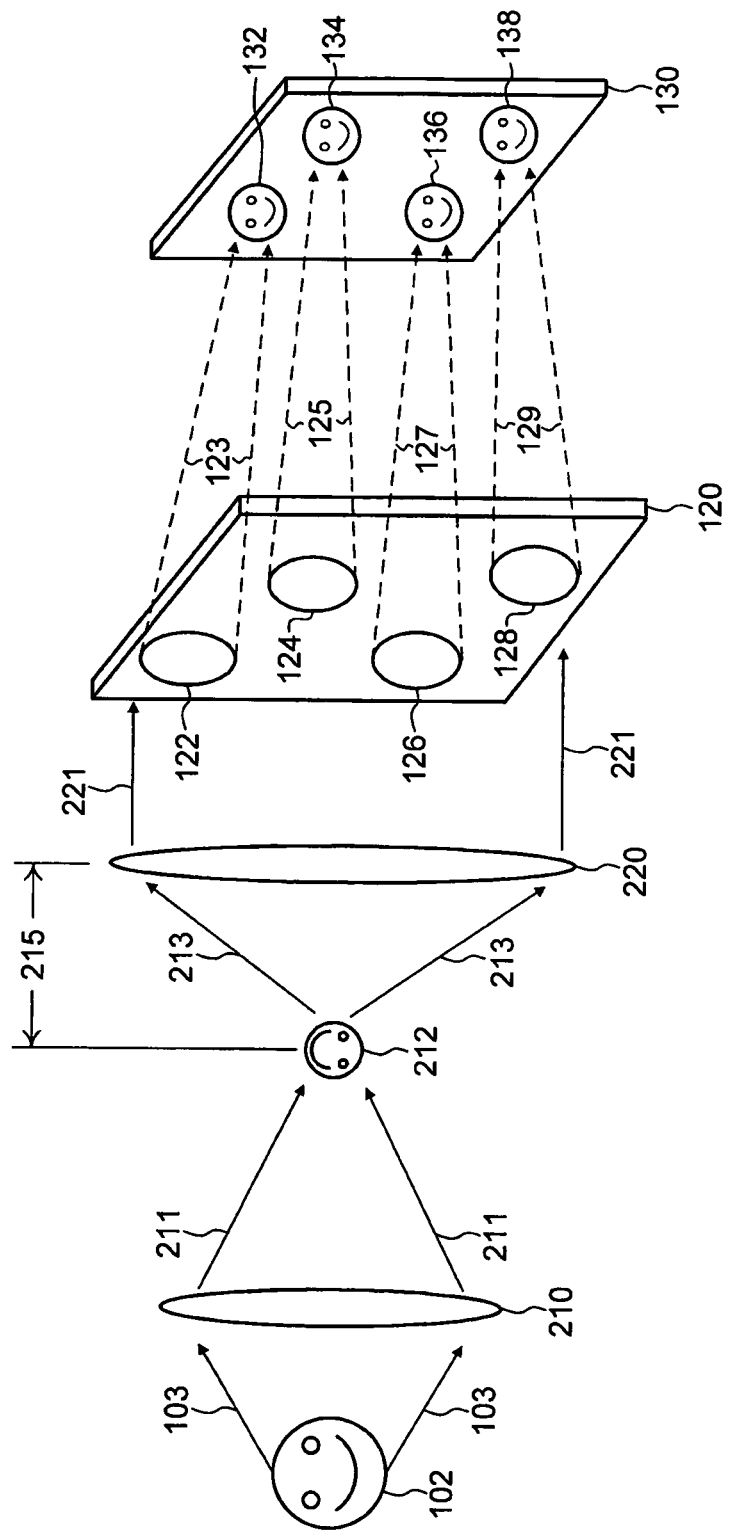
FIG. 2 shows a schematic diagram of an embodiment of a multi-image optical system in which an image focussed at infinity is formed by a primary lens and a secondary lens.

As discussed above, in the embodiment shown in FIG. 1, object 102 is constrained such that the distance 105 between object 102 and lens 110 is substantially equal to the focal length of lens 110. FIG. 2 shows a schematic diagram (perspective view) of a second embodiment of a multi-image optical system, in which this constraint is removed. Light rays 103 enter lens 210, referred to as a primary lens, which focuses light rays 211 to form intermediate image 212. In an embodiment, lens 210 is a zoom lens, which permits variable magnification. Light rays 213 from intermediate image 212 enter lens 220, referred to as a secondary lens. The distance 215 between intermediate image 212 and lens 220 is set substantially equal to the focal length of lens 220. Lens 220 therefore forms an image of object 102 at infinity, as represented by the parallel light rays 221 exiting lens 220. Light rays 221 enter lens 122, lens 124, lens 126, and lens 128 to form image 132, image 134, image 136, and image 138, respectively.

The distance between lens 210 and lens 220 can be varied. For different distances of object 102, lens 210 is moved to maintain the position of intermediate image 212 such that the distance 215 between intermediate image 212 and lens 220 stays substantially fixed at the focal length of lens 220.

Figure 3:
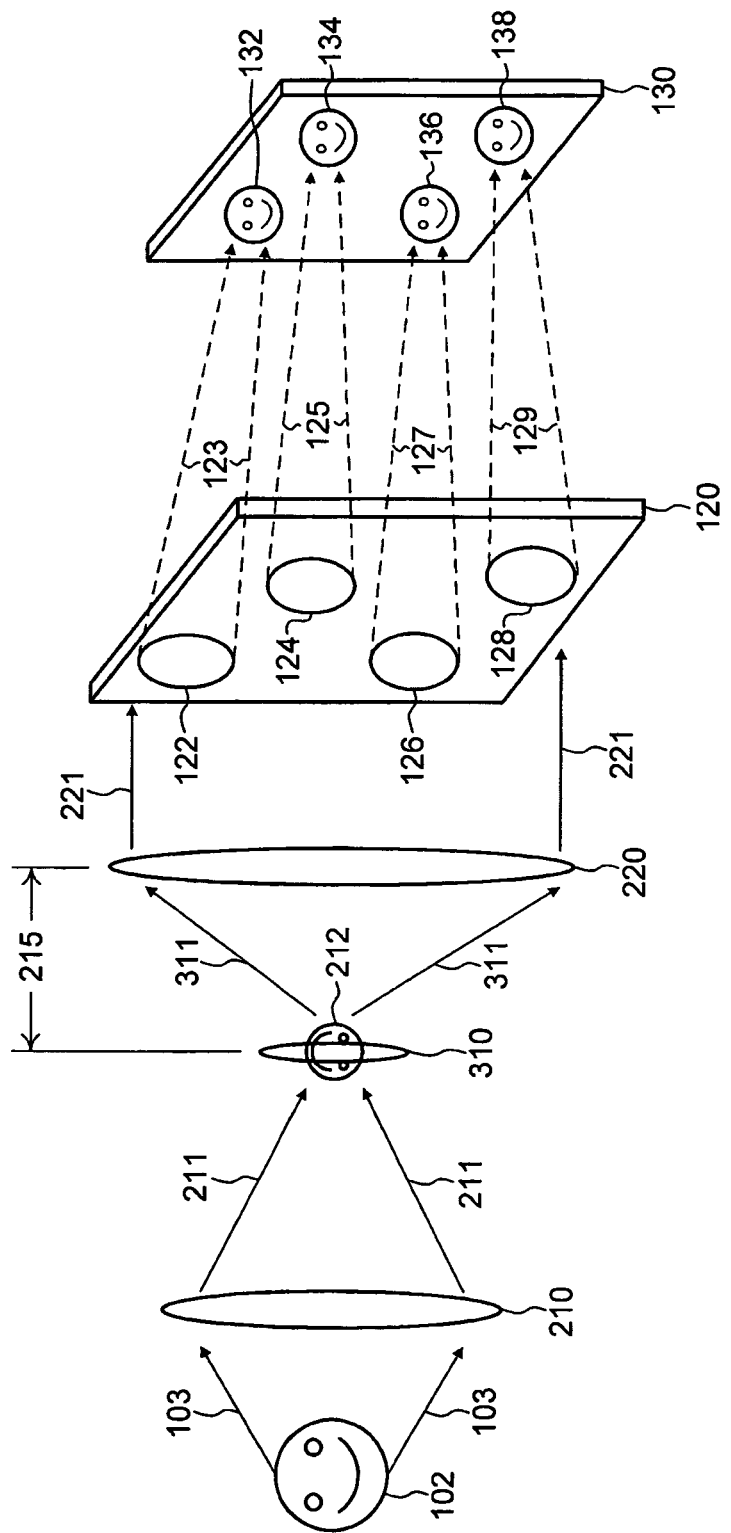
FIG. 3 shows a schematic diagram of an embodiment of a multi-image optical system in which an image focussed at infinity is formed by a primary lens, a field lens, and a secondary lens.

In the embodiment shown in FIG. 2, some of the light captured by lens 210 is not captured by lens 220. FIG. 3 shows a schematic diagram (perspective view) of a third embodiment of a multi-image optical system, in which the efficiency of transferring light from lens 210 to lens 220 is improved. Light rays 103 enter lens 210, which focuses light rays 211 to form intermediate image 212. Light rays 211 enter lens 310, referred to as a field lens. The focal length of the lens 310 is such that it causes the light from the aperture of lens 210 to be imaged to the aperture of lens 220 and be completely collected by lens 220.

Light rays 311 exit lens 310 and enter lens 220. The distance 215 between lens 310 (and intermediate image 212) and lens 220 is set substantially equal to the focal length of lens 220. Lens 220 therefore forms an image of object 102 at infinity, as represented by the parallel light rays 221 exiting lens 220. Light rays 221 enter lens 122, lens 124, lens 126, and lens 128 to form image 132, image 134, image 136, and image 138, respectively.

The distance between lens 210 and lens 220 can be varied. For different distances of object 102, lens 210 is moved to maintain the position of intermediate image 212 such that the distance 215 between intermediate image 212 and lens 220 stays substantially fixed at the focal length of lens 220.

The embodiments of the multi-image optical systems shown in FIG. 1, FIG. 2, and FIG. 3 can each be partitioned into two optical subsystems. The first optical subsystem, referred to as an infinity optical subsystem, forms an image of an object in which the image is focussed at infinity. In the embodiment shown in FIG. 1, the infinity optical subsystem comprises lens 110. In the embodiment shown in FIG. 2, the infinity optical subsystem comprises lens 210 and lens 220. In the embodiment shown in FIG. 3, the infinity optical subsystem comprises lens 210, lens 220, and lens 310.

The second optical subsystem, referred to as a multi-image optical subsystem, receives the image focussed at infinity and forms at least two separate images on an image detector. At least two of the separate images undergo different optical processing (as discussed further below). In the embodiments shown in FIG. 1, FIG. 2, and FIG. 3, the multi-image optical subsystem comprises carrier plate 120, lens 122, lens 124, lens 126, lens 128, and image detector 130.

FIG. 4-FIG. 8 show different embodiments of a multi-image optical subsystem.

Figure 4:
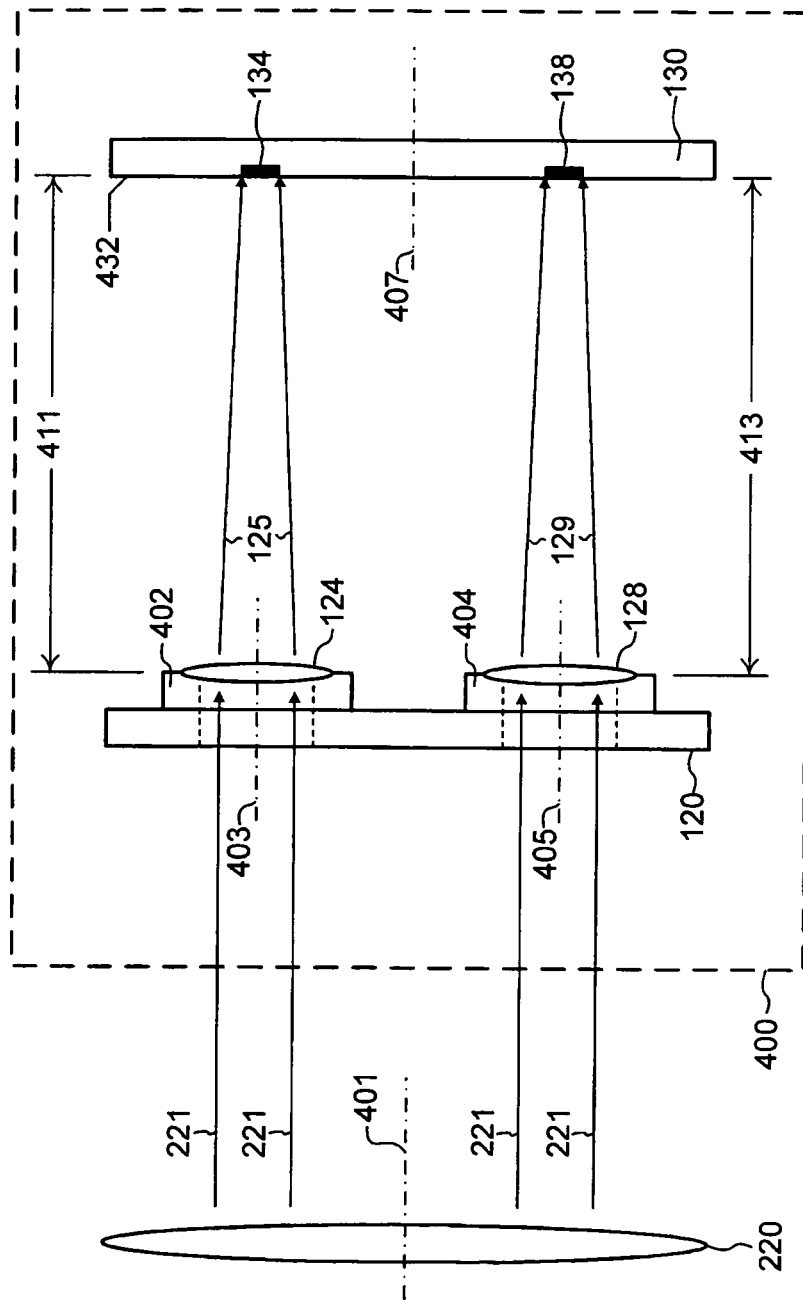
FIG. 4 shows a schematic diagram of an embodiment of a multi-image optical subsystem in which a first focussing lens and a second focussing lens have different focal lengths.

FIG. 4 shows a schematic diagram (side view) of multi-image optical subsystem 400. Multi-image optical subsystem 400 receives an image focussed at infinity, as represented by parallel light rays 221 from lens 220 (FIG. 2 and FIG. 3). The array of lenses comprises two focussing lenses, lens 124 and lens 128. The optical axis 401 of lens 220, the optical axis 403 of lens 124, the optical axis 405 of lens 128, and the normal axis 407 of image plane 432 (on image detector 130) are substantially parallel. Lens 124 is mounted on lens mount 402, which is mounted on carrier plate 120. Lens 128 is mounted on lens mount 404, which is mounted on carrier plate 120. The distance 411 between lens 402 and image plane 432 is substantially equal to the distance 413 between lens 128 and image plane 432. The focal length of lens 124 is different from the focal length of lens 128.

Lens 124 focuses light rays 125 to form image 134 on image plane 432. Lens 128 focuses light rays 129 to form image 138 on image plane 432. Image 134 and image 138 are focussed at different depths and correspond to different depth segments in the object 102.

Figure 5:
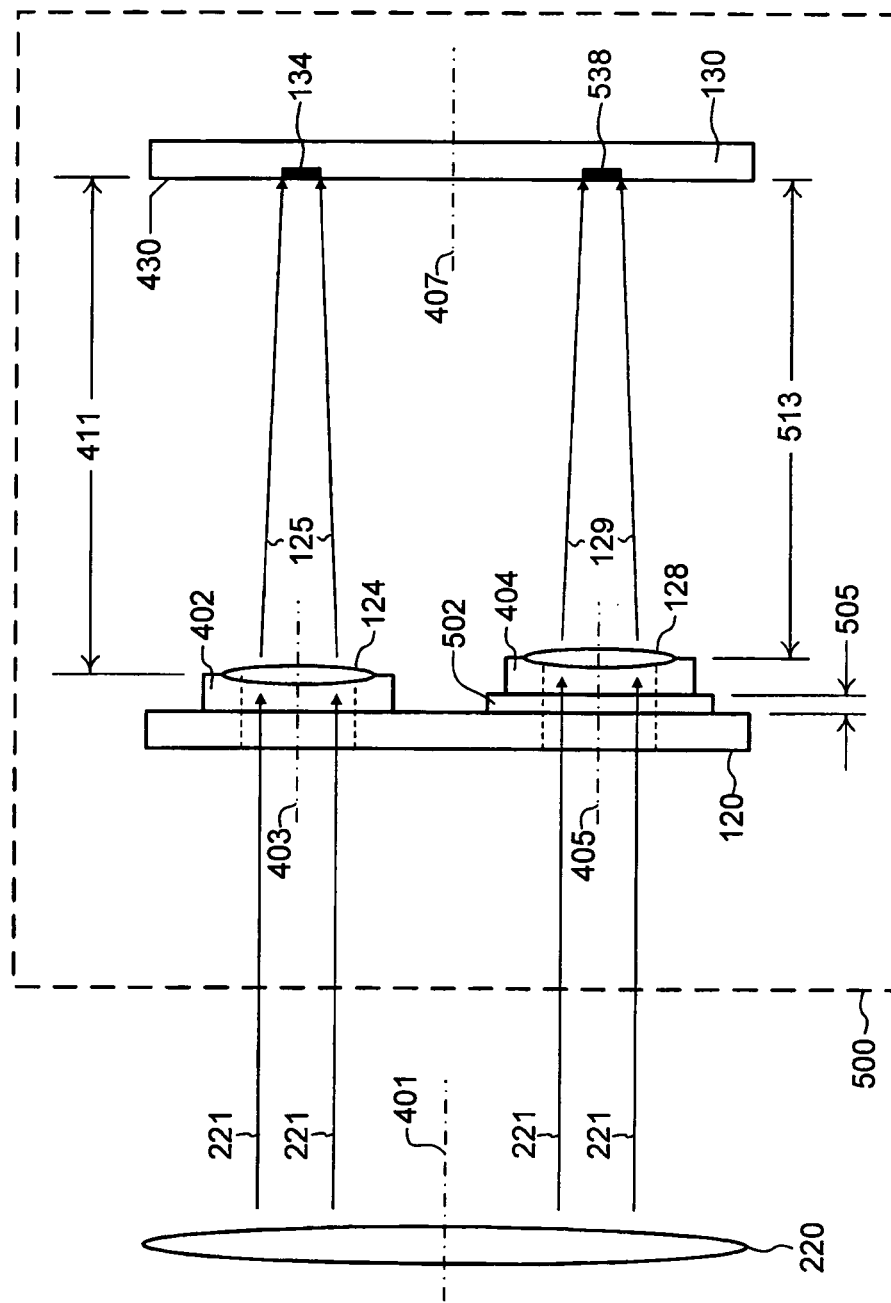
FIG. 5 shows a schematic diagram of an embodiment of a multi-image optical subsystem in which a first focussing lens and a second focussing lens have different distances to an image plane.

FIG. 5 shows a schematic diagram (side view) of multi-image optical subsystem 500. Multi-image optical subsystem 500 receives an image focussed at infinity, as represented by parallel light rays 221 from lens 220 (FIG. 2 and FIG. 3). The array of lenses comprises two focussing lenses, lens 124 and lens 128. The optical axis 401 of lens 220, the optical axis 403 of lens 124, the optical axis 405 of lens 128, and the normal axis 407 of image plane 432 (on image detector 130) are substantially parallel. Lens 124 is mounted on lens mount 402, which is mounted on carrier plate 120. Lens 128 is mounted on lens mount 404. A spacer 502, with thickness 505, is inserted between lens mount 404 and carrier plate 120. The distance 411 between lens 402 and image plane 430 is greater than the distance 513 between lens 128 and image plane 432. The focal length of lens 124 is substantially equal to the focal length of lens 128.

Lens 124 focuses light rays 125 to form image 134 on image plane 432. Lens 128 focuses light rays 129 to form image 538 on image plane 432. Image 134 and image 538 are focussed at different depths and correspond to different depth segments in the object 102.

Figure 6:
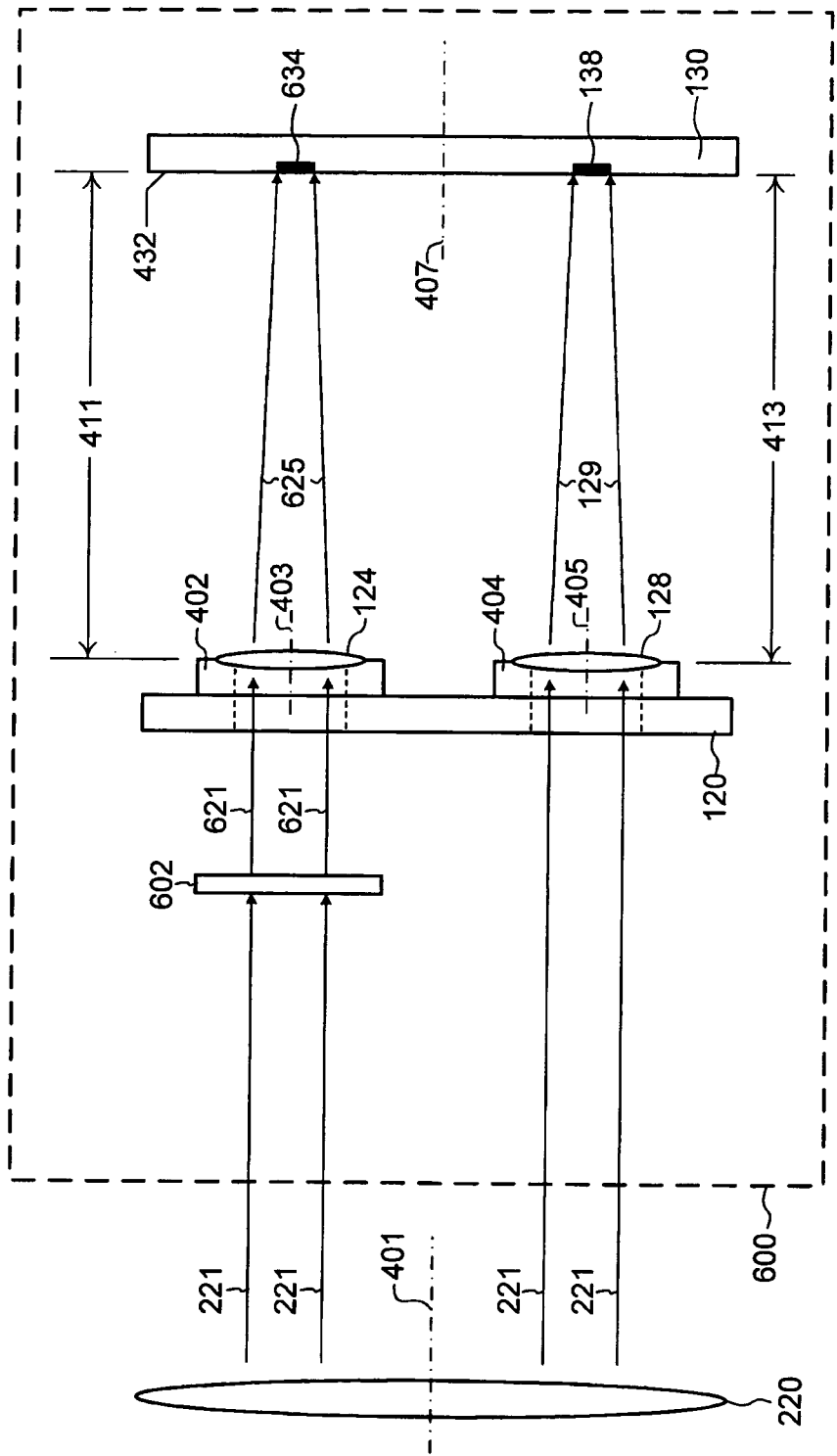
FIG. 6 shows a schematic diagram of an embodiment of a multi-image optical subsystem in which light is passed through a filter and transmitted to a focussing lens.

FIG. 6 shows a schematic diagram (side view) of multi-image optical subsystem 600. Multi-image optical subsystem 600 receives an image focussed at infinity, as represented by parallel light rays 221 from lens 220 (FIG. 2 and FIG. 3). The array of lenses comprises two focussing lenses, lens 124 and lens 128. The optical axis 401 of lens 220, the optical axis 403 of lens 124, the optical axis 405 of lens 128, and the normal axis 407 of image plane 432 (on image detector 130) are substantially parallel. Lens 124 is mounted on lens mount 402, which is mounted on carrier plate 120. Lens 128 is mounted on lens mount 404, which is mounted on carrier plate 120. The distance 411 between lens 402 and image plane 432 is substantially equal to the distance 413 between lens 128 and image plane 432. The focal length of lens 124 is substantially equal to the focal length of lens 128.

Filter 602 receives light rays 221 and transmits light rays 621 to lens 124, which focuses light rays 625 to form image 634 on image plane 432. Lens 128 receives light rays 221 and focuses light rays 129 to form image 138 on image plane 432.

Examples of filters include neutral density filters, spectral filters, polarization filters, and aperture filters.

A neutral density filter attenuates the intensity of light.

A spectral filter passes light with wavelengths λ within a specific spectral range, $\lambda_s \leq \lambda \leq \lambda_l$, $\lambda_s$ where is the short wavelength cutoff wavelength and $\lambda_l$ is the long wavelength cutoff wavelength. In some instances, only one cutoff wavelength is explicitly stated ($\lambda \geq \lambda_s$, or $\lambda \leq \lambda_l$); however, the transmission properties of the spectral filter typically limit both the maximum and the minimum wavelength that is transmitted. Note that the spectral range can also be specified in the frequency domain, and spectral filters are designated as high-pass, low-pass, and bandpass filters.

A polarization filter passes light within a specific polarization range. For linearly-polarized light, a polarization filter passes light with a polarization angle $\phi_{lp}$ within a polarization angle range $\phi_{lp1} \leq \phi_{lp} \leq \phi_{lp2}$, where $\phi_{lp1}$ and $\phi_{lp2}$ are user-defined limits. For circularly-polarized light, a polarization filter passes light with a specific rotation direction (left-handed or right-handed). For elliptically-polarized light, a polarization filter passes light with a specific rotation direction (left-handed or right-handed) and a polarization angle $\phi_{ep}$ within a polarization angle range $\phi_{ep1} \leq \phi_{ep} \leq \phi_{ep2}$, where $\phi_{ep}$ is the angle of the major axis of the ellipse, and $\phi_{ep1}$ and $\phi_{ep2}$ are user-defined limits.

Aperture filters comprise apertures and spatial filters. Aperture filters range in complexity from a simple circular hole in a plate to complex arrays of openings with different shapes, sizes, and positions. A simple aperture, such as commonly found in many camera lenses, controls the intensity of light and the depth of field. Decreasing the diameter of the aperture decreases the intensity and increases the depth of field.

A spatial filter modifies the spatial content, either in terms of light distribution or image information, in the spatial domain. In the simplest form, an aperture can be used to reduce the high frequency content in an image by degrading the spatial resolution of information captured from an object. The effect is to blur some information and soften edges in the image. It also increases the depth-of-field as a by-product. Conversely, a ring aperture can be used to increase the contrast of edges (high frequency information). In more sophisticated applications, a shaped aperture can be used to soften edges in one direction while maintaining edge sharpness in another or to select features of a particular size or shape. Complex coded aperture filters are designed to pull out specific shapes or features from an image.

In some lenses (exhibiting chromatic shift), the focal length is a function of wavelength. The focal length can therefore be varied by filtering the light through a spectral filter. In birefringent lenses, the focal length is a function of polarization. The focal length can therefore be varied by filtering the light through a polarization filter.

In general, a filter changes the information content of an image. For example, if an object has regions with different reflectivities, the light intensity in certain regions can be high enough to saturate the image detector (or overexpose photographic film). A neutral density filter can reduce the intensity to within the detection range of the image detector (or exposure range of the photographic film).

Different regions of the object can also have different colors and different polarization characteristics. The brightness and contrast of features in an image therefore can also be controlled by spectral filters and polarization filters. Referring back to FIG. 1-FIG. 3, the intensity, spectral range, and polarization characteristics of light rays 103 depend both on the intensity, spectral range, and polarization characteristics of the light incident on object 102 and on the structural and optical properties of object 102.

In the embodiment shown in FIG. 6, light rays 221 pass through a single filter (filter 602) before entering lens 124; and light rays 221 are not filtered before entering lens 128. Image 634 and image 138 in general will have different information content. In other embodiments, light rays 221 can pass through combinations of multiple filters before entering a focussing lens. For example, light rays 221 can pass through a spectral filter and an aperture filter before entering lens 124. In other embodiments, light rays 221 can also pass through one or more filters before entering lens 128 as well. For example, light rays 221 can pass through a spectral filter with a spectral range $\lambda_1 \leq \lambda \leq \lambda_2$ before entering lens 124, and light rays 221 can pass through a spectral filter with a different spectral range $\lambda_3 \leq \lambda \leq \lambda_4$ before entering lens 128. As another example, light rays 221 can pass through a combination of a linear-polarization filter and a spectral filter before entering lens 124, and light rays 221 can pass through an aperture filter before entering lens 128.

Note that filters can also be used in embodiments of multi-image optical subsystems in which the focussing lenses have different focal lengths (FIG. 4) and in embodiments of multi-image optical subsystems in which the distances between focussing lenses and the image plane are different (FIG. 5). In general, two images formed from light rays 221 transmitted through different filters can correspond to the same depth segment or to different depth segments of the object.

Figure 7:
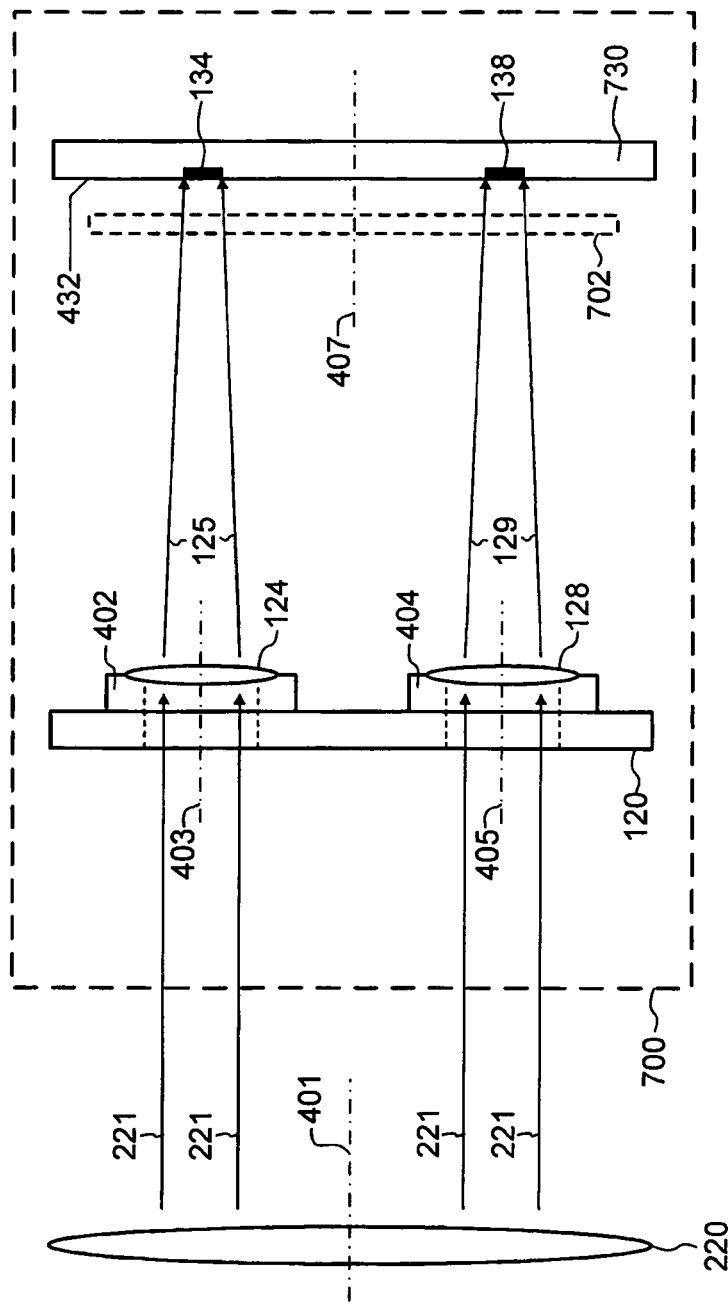
FIG. 7 shows a schematic diagram of an embodiment of a multi-image optical subsystem in which images are captured on photographic film.

FIG. 7 shows a schematic diagram (side view) of multi-image optical subsystem 700. Multi-image optical subsystem 700 is similar to multi-image optical subsystem 400, previously shown in FIG. 4. In multi-image optical subsystem 400, image 134 and image 138 are formed on image plane 432, which lies on the surface of image detector 130. In multi-image optical subsystem 700, image 134 and image 138 are formed on image plane 432, which lies on the surface of photographic film 730, which is exposed via shutter 702. Note that photographic film can be sensitive to visible, infrared, or ultraviolet light. After the photographic film 730 has been developed, the images can be viewed by eye or digitized for further image processing.

Figure 8:
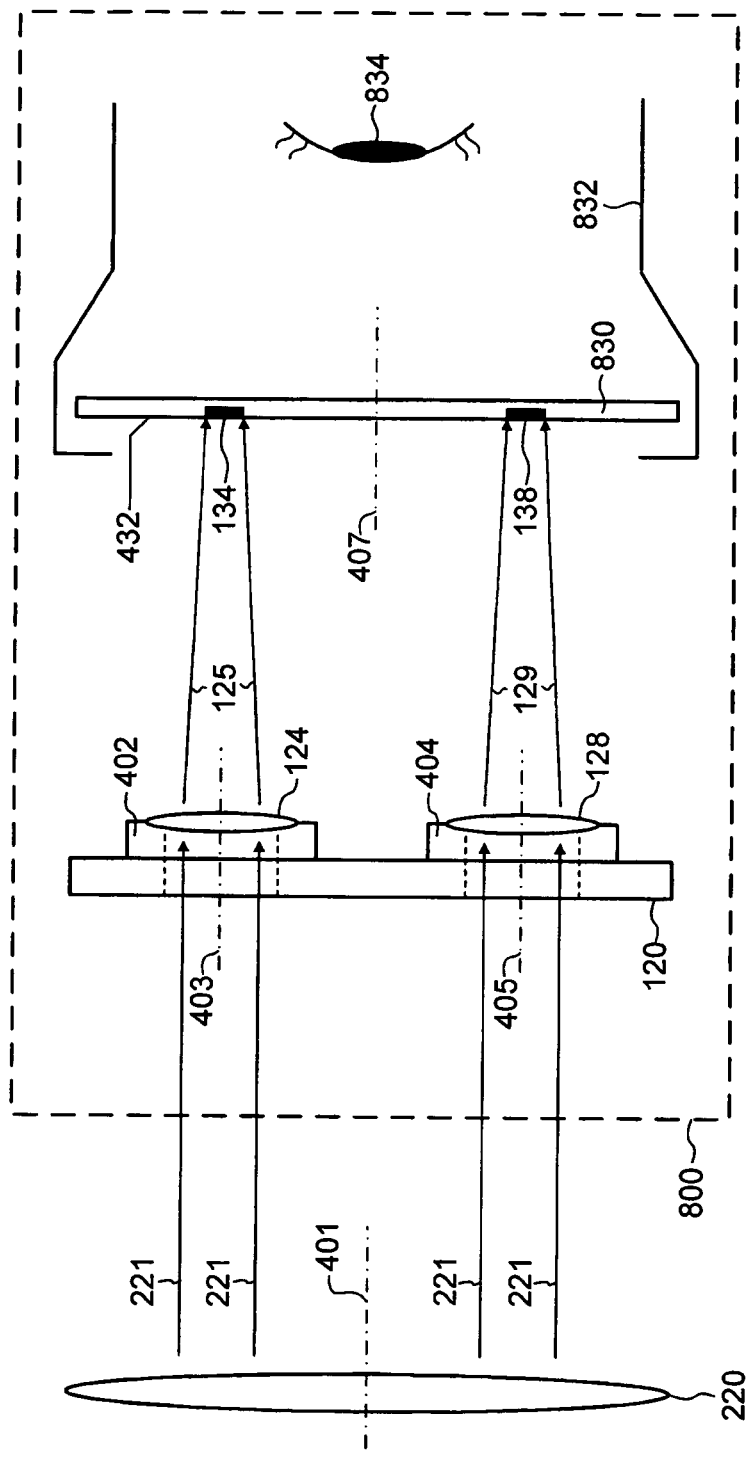
FIG. 8 shows a schematic diagram of an embodiment of a multi-image optical subsystem in which images are displayed on a view screen.

FIG. 8 shows a schematic diagram (side view) of multi-image optical subsystem 800. Multi-image optical subsystem 800 is similar to multi-image optical subsystem 400, previously shown in FIG. 4. In multi-image optical subsystem 400, image 134 and image 138 are formed on image plane 432, which lies on the surface of image detector 130. In multi-image optical subsystem 800, image 134 and image 138 are formed on image plane 432, which lies on the surface of view screen 830. Image 134 and image 138 are viewed by eye 834 through view hood 832.

For simplicity, the array of lenses in the embodiments shown in FIG. 4-FIG. 8 include two focussing lenses. As discussed above, in general, an array of lenses can have two or more focussing lenses. Several factors determine the number of focussing lenses. One factor is the depth resolution and depth range desired; for a given depth resolution, a larger depth range requires a larger number of focussing lenses. A second factor is the available maximum apertures of highly corrected objective lenses (or equivalent primary lenses and secondary lenses) used to form an image focussed at infinity. A third factor is the desired depth of field of a focussing lens. For a specific focal length, the depth of field increases as the aperture of the focussing lens decreases. For a specific aperture of the objective lens (or equivalent primary lens and secondary lens), the diameters of the focussing lenses need to be decreased in order to accommodate a larger number of focussing lenses. The depth of field increases, and the depth resolution decreases.

For an array of lenses with more than two focussing lenses, various combinations of focal lengths, distances of the focussing lenses from the image plane, and filters can be used.

Figure 9:
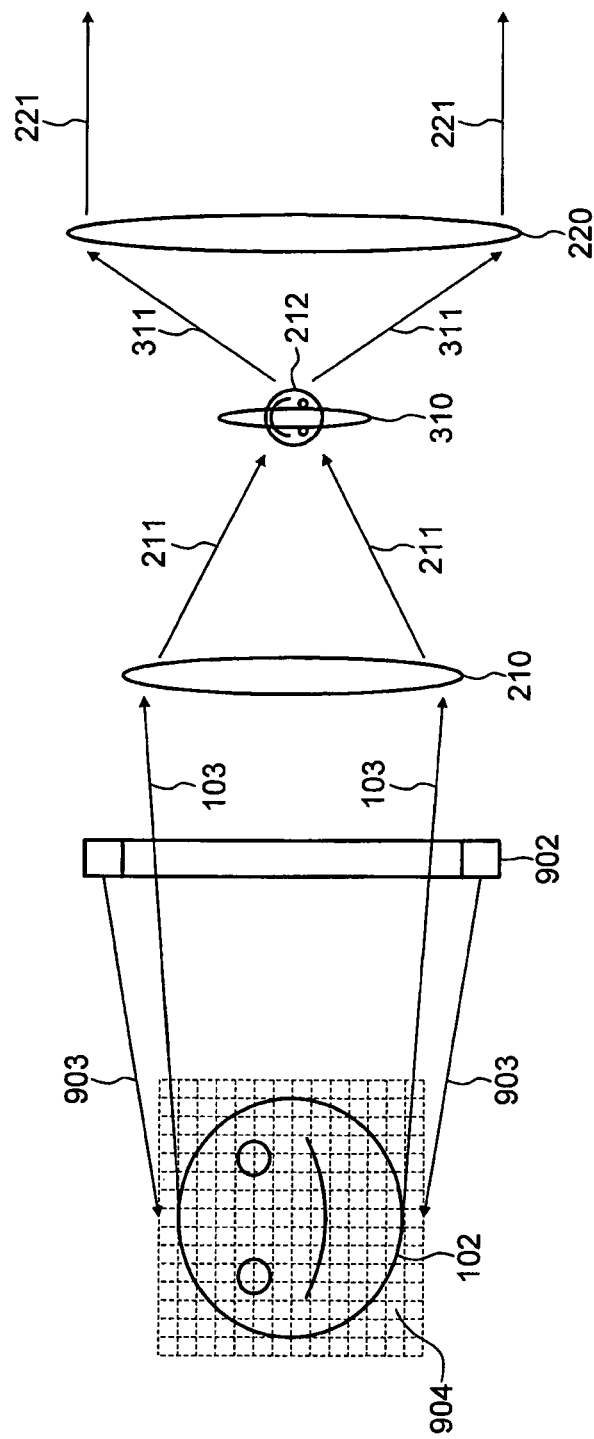
FIG. 9 shows an embodiment of a multi-image optical system in which a coaxial light source projects a structured pattern onto an object.

FIG. 9 shows a schematic diagram (side view) of an embodiment a multi-image optical system with an integral light source. Light source 902 emits light rays 903 and projects structured pattern 904 onto object 102. The structured pattern 904 is advantageous for analyzing images when object 102 has little surface texture. In the embodiment shown in FIG. 9, structured pattern 904 is represented by a square grid. Other structured patterns, such as an array of parallel lines or an array of concentric circles, can be used.

In general, the light source is substantially coaxial with lens 210. In the embodiment shown in FIG. 9, light source 902 represents a coaxial ring light. In a second embodiment, coaxial illumination is provided via a beam splitter introduced between object 102 and lens 210. In a third embodiment, a light source is positioned in close proximity to lens 210 (similar to a flash unit mounted on a camera). In contrast, light sources used in typical oblique lighting systems are intentionally positioned away from the optical axis (for example, 45 degrees or more).

Figure 10:
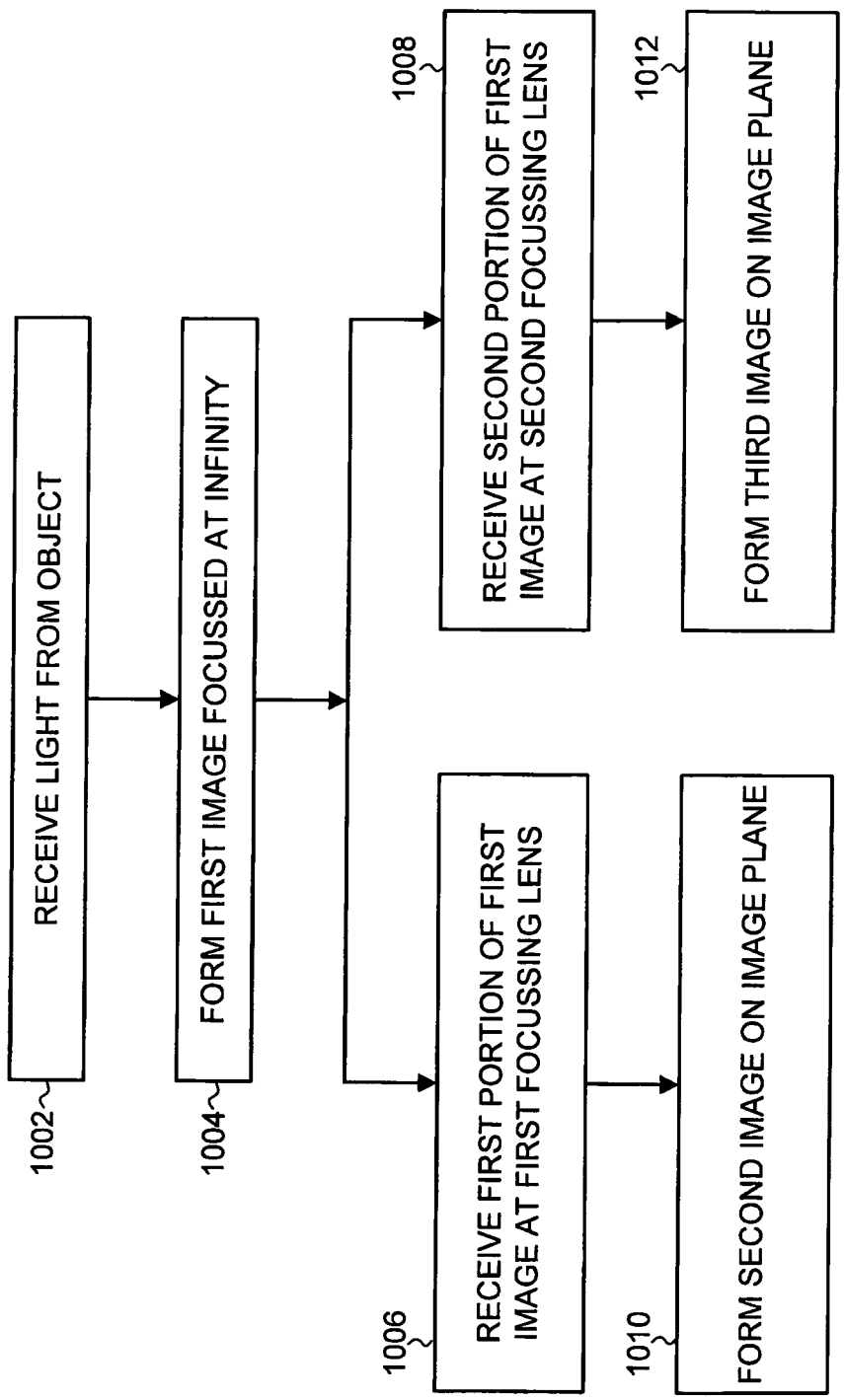
FIG. 10 shows a flowchart for a first embodiment of a method for forming multiple images.

FIG. 10 shows a flowchart of steps for a first embodiment of a method for forming multiple images. In step 1002, light is received from an object (such as object 102 in FIG. 1) by an infinity optical subsystem (such as lens 110 in FIG. 1). The process then passes to step 1004, in which a first image focussed at infinity is formed by the infinity optical subsystem.

The process then passes in parallel to step 1006 and step 1008. In step 1006, a first portion of the first image is received at a first focussing lens (such as lens 124 in FIG. 4). The process then passes to step 1010, in which a second image (such as image 134 in FIG. 4) is formed by the first focussing lens on an image plane (such as image plane 432 in FIG. 4). The second image corresponds to a first depth segment in the object. In step 1008, a second portion of the first image is received at a second focussing lens (such as lens 128 in FIG. 4). The process then passes to step 1012, in which a third image (such as image 138 in FIG. 4) is formed by the second focussing lens on the image plane. The third image corresponds to a second depth segment in the object. The second depth segment is different from the first depth segment.

Figure 11:
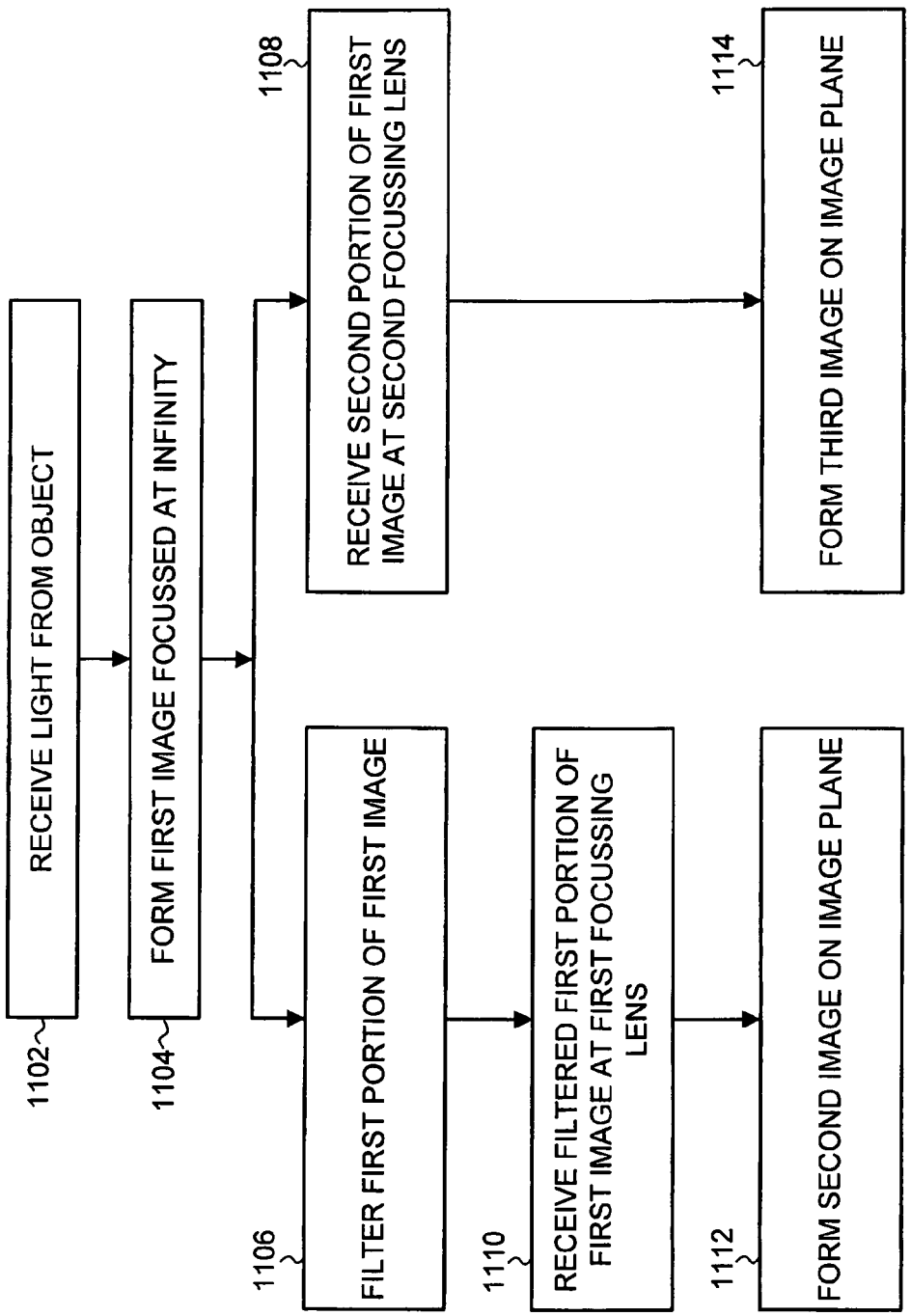
FIG. 11 shows a flowchart for a second embodiment of a method for forming multiple images.

FIG. 11 shows a flowchart of steps for a second embodiment of a method for forming multiple images. In step 1102, light is received from an object (such as object 102 in FIG. 1) by an infinity optical subsystem (such as lens 110 in FIG. 1). The process then passes to step 1104, in which a first image focussed at infinity is formed by the infinity optical subsystem.

The process then passes in parallel to step 1106 and step 1108. In step 1106, a first portion of the first image is filtered (such as by filter 602 in FIG. 6). The process then passes to step 1110, in which the filtered first portion of the image is received at a first focussing lens (such as lens 124 in FIG. 6). The process then passes to step 1112, in which a second image (such as image 634 in FIG. 6) is formed by the first focussing lens on an image plane (such as image plane 432 in FIG. 6). The second image corresponds to a first depth segment in the object. In step 1108, a second portion of the first image is received at a second focussing lens (such as lens 128 in FIG. 6). The process then passes to step 1114, in which a third image (such as image 138 in FIG. 6) is formed by the second focussing lens on the image plane. The third image corresponds to a second depth segment in the object. In some embodiments, the second depth segment is different from the first depth segment. In other embodiments, the second depth segment is substantially equal to the first depth segment.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for simultaneously forming multiple images of an object comprising a plurality of depth segments, the method comprising the steps of:
  receiving light from the object and forming a first image focussed at infinity;
  filtering a first portion of the first image;
  receiving the filtered first portion of the first image at a first focussing lens and forming a second image on an image plane, wherein:
    the first focussing lens has a first focal length;
    the first focussing lens is disposed at a first distance from the imaging plane; and
    the second image corresponds to a first depth segment selected from the plurality of depth segments in the object;

receiving a second portion of the first image at a second focussing lens and forming a third image on the image plane, wherein:
 the second focussing lens has a second focal length;
 the second focussing lens is disposed at a second distance from the imaging plane; and
 the third image corresponds to a second depth segment selected from the plurality of depth segments in the object;
 wherein the second depth segment is different from the first depth segment such that the second and third images are focussed at different depths relative to one another and the second and third images correspond to different depth segments in the object; and
 the first and the second focussing lenses are positioned such that the second and third images are formed simultaneously on the image plane.

2. The method of claim 1, wherein the step of filtering a first portion of the first image comprises the step of transmitting the first portion of the first image through:
 a neutral density filter;
 a spectral filter;
 a polarization filter; or
 an aperture filter.

3. The method of claim 1, further comprising the steps of:
 filtering a fourth portion of the first image; and
 forming the second portion of the image from the filtered fourth portion of the first image.

4. The method of claim 3, wherein the step of filtering a fourth portion of the first image comprises the step of transmitting the fourth portion of the first image through:
 a neutral density filter;
 a spectral filter;
 a polarization filter; or
 an aperture filter.

* * * * *